United States Patent
Lubana et al.

(10) Patent No.: US 11,694,314 B2
(45) Date of Patent: Jul. 4, 2023

(54) DIGITAL FOVEATION FOR MACHINE VISION

(71) Applicant: The Regents of the University of Michigan, Ann Arbor, MI (US)

(72) Inventors: Ekdeep Singh Lubana, Ann Arbor, MI (US); Robert P. Dick, Chelsea, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 448 days.

(21) Appl. No.: 17/032,499

(22) Filed: Sep. 25, 2020

(65) Prior Publication Data

US 2021/0089803 A1 Mar. 25, 2021

Related U.S. Application Data

(60) Provisional application No. 62/905,918, filed on Sep. 25, 2019.

(51) Int. Cl.
*G06T 7/00* (2017.01)
*G06T 7/207* (2017.01)
(Continued)

(52) U.S. Cl.
CPC .......... *G06T 7/0002* (2013.01); *G06F 18/213* (2023.01); *G06F 18/24* (2023.01);
(Continued)

(58) Field of Classification Search
CPC ...... G06V 10/25; G06V 10/20; G06V 10/255; G06V 10/82; G06V 10/513; G06F 18/213;
(Continued)

(56) References Cited

U.S. PATENT DOCUMENTS

| 6,252,989 B1 | 6/2001 | Geisler et al. |
| 7,489,334 B1 | 2/2009 | Pickering et al. |

(Continued)

FOREIGN PATENT DOCUMENTS

WO 2018136301 A1 7/2018

OTHER PUBLICATIONS

6.6 Megapixel CMOS Image Sensor, Data Sheet NOII4SM6600A, ON Semicond., Phoenix, AZ, USA, Dec. 2016.
(Continued)

*Primary Examiner* — Christopher M Brandt
(74) *Attorney, Agent, or Firm* — Lempia Summerfield Katz LLC (57) ABSTRACT

A machine vision method includes obtaining a first representation of an image captured by an image sensor array, analyzing the first representation for an assessment of whether the first representation is sufficient to support execution of a machine vision task by the processor, if the first representation is not sufficient, determining, based on the first representation, a region of the image of interest for the execution of the machine vision task, reusing the image captured by the image sensor array to obtain a further representation of the image by directing the image sensor array to sample the image captured by the image sensor array in a manner guided by the determined region of the image of interest and by the assessment, and analyzing the further representation to assess whether the further representation is sufficient to support the execution of the machine vision task by implementing a procedure for the execution of the machine vision task in accordance with the further representation.

28 Claims, 5 Drawing Sheets

(51) Int. Cl.

| | | |
|---|---|---|
| *G06T 7/70* | (2017.01) | |
| *G06T 9/00* | (2006.01) | |
| *G06V 10/25* | (2022.01) | |
| *G06F 18/24* | (2023.01) | |
| *G06F 18/213* | (2023.01) | |
| *H04N 23/667* | (2023.01) | |
| *H04N 23/695* | (2023.01) | |
| *G06V 10/82* | (2022.01) | |
| *G06V 10/20* | (2022.01) | |
| *G06V 10/40* | (2022.01) | |

(52) U.S. Cl.
CPC ............... *G06T 7/207* (2017.01); *G06T 7/70* (2017.01); *G06T 9/00* (2013.01); *G06V 10/20* (2022.01); *G06V 10/25* (2022.01); *G06V 10/255* (2022.01); *G06V 10/82* (2022.01); *H04N 23/667* (2023.01); *H04N 23/695* (2023.01); *G06V 10/513* (2022.01)

(58) Field of Classification Search
CPC . G06F 18/24; G06T 7/207; G06T 7/70; G06T 9/00; G06T 2207/20016; G06T 2207/20081; G06T 2207/20084; G06T 2207/30168; G06T 7/0002; H04N 23/667; H04N 23/695; H04N 25/443
See application file for complete search history.

(56) References Cited

U.S. PATENT DOCUMENTS

| | | | |
|---|---|---|---|
| 7,973,834 | B2 | 7/2011 | Yang |
| 8,094,965 | B2 | 1/2012 | Shimizu et al. |
| 9,030,583 | B2 | 5/2015 | Gove et al. |
| 9,230,302 | B1 | 1/2016 | Owechko et al. |
| 9,288,458 | B1* | 3/2016 | Chen .................. G06T 5/50 |
| 9,727,991 | B2 | 8/2017 | Guenter et al. |
| 10,075,701 | B2 | 9/2018 | Cole et al. |
| 2002/0064314 | A1 | 5/2002 | Comaniciu et al. |
| 2003/0194141 | A1 | 10/2003 | Kortum et al. |
| 2005/0018911 | A1 | 1/2005 | Deever |
| 2018/0040097 | A1 | 2/2018 | Saleh et al. |
| 2018/0204114 | A1 | 7/2018 | Andreopoulos |
| 2018/0241953 | A1 | 8/2018 | Johnson |
| 2018/0308266 | A1 | 10/2018 | Surti et al. |
| 2019/0320127 | A1* | 10/2019 | Buckler .................. H04N 25/75 |

OTHER PUBLICATIONS

S. Ribarić, "License plate detection, recognition, and automated storage" Univ. Zagreb, Zagreb, Croatia, Rep., 2003. Available: http://www.zemris.fer.hr/projects/LicensePlates/.

1/2.5-Inch 5Mp CMOS Digital Image Sensor, Data Sheet MT9P031, Aptina, San Jose, CA, USA, 2005.

A. Omid-Zohoor, C. Young, D. Ta, and B. Murmann, "Toward Always-On Mobile Object Detection: Energy Versus Performance Tradeoffs for Embedded HOG Feature Extraction" IEEE Transactions on Circuits and Systems for Video Technology, vol. 28, No. 5, pp. 1102-1115, May 2018.

Ashish Bora, Eric Price, and Alexandros G. Dimakis, "AmbientGAN: Generative models from lossy measurements" in Int. Conf. on Learning Representations, 2018.

B. Cheung, E. Weiss, and B. A. Olshausen, "Emergence of foveal image sampling from learning to attend in visual scenes," in Proc. Int. Conf. Learn. Represent., vol. abs/1611.09430, 2016.

D. Duarte, N. Vijaykrishnan, and M. J. Irwin, "A complete phase-locked loop power consumption model" in Proc. IEEE Design Autom. Test Europe Conf., Paris, France, Mar. 2002, pp. 1108-1109.

D. Jones. (2015). Camera Hardware—Picamera 1.13 Documentation; Available: https://picamera.readthedocs.io/en/release-1.13/fov.html.

D. Jones. (2016). API-Mmalobj-Picamera 1.13 Documentation. Available: https://picamera.readthedocs.io/en/release-1.13/api_mmalobj.html.

D. Kim, M. Song, B. Choe, and S. Y. Kim, "A Multi-Resolution Mode CMOS Image Sensor with a Novel Two-Step Single-Slope ADC for Intelligent Surveillance Systems" Sensors, vol. 17, No. 7, 2017.

Emmanuel J Cand'es and Michael B Wakin, "An introduction to compressive sampling" IEEE Signal Processing Magazine, vol. 25, No. 2, pp. 21-30, 2008.

F. Faradji, A. H. Rezaie, and M. Ziaratban, "A morphological-based license plate location" in Proc. IEEE Int. Conf. Image Process., vol. 1. San Antonio, TX, USA, Sep. 2007, pp. 57-60.

F. Jurie, "A new log-polar mapping for space variant imaging. Application to face detection and tracking" Pattern Recognit., vol. 32, No. 5, pp. 865-875, 1999.

H. Cheng, B. Choubey, and S. Collins, "A Wide Dynamic Range CMOS Image Sensor with an Adjustable Logarithmic Response" in Proc. SPIE Sensors, Cameras, and Systems for Industrial/Scientific Applications, 2008, vol. 6816, pp. 1-8.

H. Xiao, K. Rasul, and R. Vollgraf, "Fashion-MNIST: a Novel Image Dataset for Benchmarking Machine Learning Algorithms" ArXiv e prints, Aug. 2017.

Hiroyuki Yamamoto, Yehezkel Yeshurun, Martin D. Levine, An Active Foveated Vision System: Attentional Mechanisms and Scan Path Covergence Measures, Computer Vision and Image Understanding vol. 63, Issue 1, Jan. 1996, pp. 50-65.

IMX219PQH5: Module Design Reference Manual, V2.2, Sony, Tokyo, Japan, 2015.

J. C. SanMiguel and A. Cavallaro, "Energy consumption models for smart camera networks" IEEE Trans. Circuits Syst. Video Technol., vol. 27, No. 12, pp. 2661-2674, Dec. 2017.

J. Hu, J. Yang, V. Delhivala, and R. LiKamWa, "Characterizing the reconfiguration latency of image sensor resolution on android devices" in Proc. ACM Int. Workshop Mobile Comput. Syst. Appl., Tempe, AZ, USA, 2018, pp. 81-86.

J. Huang, V. Rathod, C. Sun, M. Zhu, A. Korattikara, A. Fathi, I. Fischer, Z. Wojna, Y. Song, S. Guadarrama, and K. Murphy, "Speed/Accuracy Trade-Offs for Modern Convolutional Object Detectors," in Proc. Conf. on Computer Vision and Pattern Recognition, 2017.

J. Ohta, Smart CMOS Image Sensors and Applications. Boca Raton, FL, USA: CRC Press, 2007.

K. Lee, S. Park, S. Park, J. Cho, and E. Yoon, "A 272.49 pJ/pixel CMOS Image Sensor with Embedded Object Detection and Bio-inspired 2D Optic Flow Generation for Nano-air-vehicle Navigation" in Symp. on VLSI Circuits, Jun. 2017, pp. C294-C295.

K. Lim, G. S. Kim, S. Kim, and K.-H. Baek, "A multi-lane MIPI CSI receiver for mobile camera applications" IEEE Trans. Consum. Electron., vol. 56, No. 3, pp. 1185-1190, Aug. 2010.

L. Zhang et al., "Accurate online power estimation and automatic battery behavior based power model generation for smartphones" in Proc. ACM Int. Conf. Hardw. Softw. Codesign Syst. Synth., Scottsdale, AZ, USA, 2010, pp. 105-114.

M. Bae, B. Choi, S. Kim, J. Lee, C. Oh, P.g Choi, and J. Shin, "Linear-Logarithmic CMOS Image Sensor with Reduced FPN Using Photogate and Cascode MOSFET" Proc. Eurosensors, vol. 1, No. 4, 2017.

M. Buckler, S. Jayasuriya, and A. Sampson, "Reconfiguring the Imaging Pipeline for Computer Vision" in Proc. Int. Conf. on Computer Vision, Oct. 2017, pp. 975-984.

M. F. Amir, J. H. Ko, T. Na, D. Kim, and S. Mukhopadhyay, "3-D Stacked Image Sensor With Deep Neural Network Computation" IEEE Sensors Journal, vol. 18, pp. 4187-4199, May 2018.

M. Yeasin and R. Sharma, Foveated Vision Sensor and Image Processing—A Review; Heidelberg, Germany: Springer, 2005, pp. 57-98.

Maya Kabkab, Pouya Samangouei, and Rama Chellappa, "Task-aware compressed sensing with generative adversarial networks" in AAAI Conf. on Artificial Intelligence, 2018.

P. Kulkarni, D. Ganesan, P. Shenoy, and Q. Lu, "SensEye: A multi-tier camera sensor network" in Proc. Int. Conf. Multimedia, Singapore, 2005, pp. 229-238.

(56) References Cited

OTHER PUBLICATIONS

P. S. Gupta and G. S. Choi, "Image acquisition system using on sensor compressed sampling technique" J. Elect. Imag., vol. 27, No. 1, pp. 013-019, 2018.

P. Viola and M. J. Jones, "Robust real-time face detection" Int. J. Comput. Vis., vol. 57, No. 2, pp. 137-154, May 2004.

R. LiKamWa, B. Priyantha, M. Philipose, L. Zhong, and P. Bahl, "Energy characterization and optimization of image sensing toward continuous mobile vision" in Proc. ACM Int. Conf. Mobile Syst. Appl. Services, Taipei, Taiwan, 2013, pp. 69-82.

R. LiKamWa, Y. Hou, J. Gao, M. Polansky, and L. Zhong, "RedEye: Analog ConvNet image sensor architecture for continuous mobile vision" in Proc. IEEE Int. Symp. Comput. Archit., Seoul, South Korea, 2016, pp. 255-266.

Rafael Beserra Gomes et al., Efficient 3D object recognition using foveated point clouds, Computers & Graphics vol. 37, Issue 5, Aug. 2013, pp. 496-508.

Ram M. Narayanan, Timothy J. Kane, Terence F. Rice and Michael J. Tauber, Considerations and Framework for Foveated Imaging Systems, Photonics 2018, 5, 18.

Robert Calderbank, Sina Jafarpour, and Robert Schapire, "Compressed learning: Universal sparse dimensionality reduction and learning in the measurement domain" Tech. Rep., Princeton University, 2009.

Ron Dekel, "Human perception in computer vision" Tech. Rep. arXiv:1701.04674, ArXiV, 2017.

S. Giulio and M. Giorgio, Retina-Like Sensors: Motivations, Technology and Applications; Vienna, Austria: Springer, 2003, pp. 251-262.

S. Lohit, K. Kulkarni, and P. Turaga, "Direct inference on compressive measurements using convolutional neural networks" in Int. Conf. on Image Processing, Sep. 2016, pp. 1913-1917.

Shai Avidan and Ariel Shamir, "Seam carving for content-aware image resizing" in ACM Trans. Graphics, 2007, vol. 26, p. 10.

V. Jain and E. Learned-Miller, "FDDB: A benchmark for face detection in unconstrained settings" Dept. Comput. Sci., Univ. Massachusetts, Boston, MA, USA, Rep. UM-CS-2010-009, 2010.

Y. Lecun, L. Bottou, Y. Bengio, and P. Haffner, "Gradient-based learning applied to document recognition" Proc. of the IEEE, vol. 86, No. 11, pp. 2278-2324, Nov. 1998.

Z. Du, R. Fasthuber, T. Chen, P. Ienne, L. Li, T. Luo, X. Feng, Y. Chen, and O. Temam "ShiDianNao: Shifting Vision Processing Closer to the Sensor" in Proc. Int. Symp. on Computer Architecture, Jun. 2015, pp. 92-104.

Z. Wang, Q. Hao, F. Zhang, Y. Hu, and J. Cao, "A variable resolution feedback improving the performances of object detection and recognition" Inst. Mech. Eng. I J. Syst. Control Eng., vol. 232, No. 4, pp. 417-427, 2018.

Zachary C. Lipton and Subarna Tripathi, "Precise recovery of latent vectors from generative adversarial networks" in Int. Conf. on Learning Representations, 2017.

Zhou Wang, Alan Conrad Bovik, Embedded Foveation Image Coding, IEEE Transactions On Image Processing, vol. 10, No. 10, Oct. 2001.

Ziwei Liu, Ping Luo, Xiaogang Wang, and Xiaoou Tang, "Deep learning face attributes in the wild" in Proc. of Int. Conf. on Computer Vision, Dec. 2015.

\* cited by examiner

DIGITAL FOVEATION FOR MACHINE VISION

CROSS-REFERENCE TO RELATED APPLICATION

This application claims the benefit of U.S. provisional application entitled "Digital Foveation for Machine Vision," filed Sep. 25, 2019, and assigned Ser. No. 62/905,918, the entire disclosure of which is hereby expressly incorporated by reference.

BACKGROUND OF THE DISCLOSURE

Field of the Disclosure

The disclosure relates generally to machine vision.

Brief Description of Related Technology

Machine vision has transformed numerous practical domains, including security, healthcare, banking, and transportation. However, machine vision systems typically have high energy consumption. The high energy consumption wastes resources and limits deployment scenarios. For instance, battery powered applications may not be capable of implementing machine vision tasks. Thus, efficient image analysis would be useful to support battery-power and other energy-constrained machine vision applications.

SUMMARY OF THE DISCLOSURE

In accordance with one aspect of the disclosure, a machine vision method includes obtaining, by a processor, a first representation of an image captured by an image sensor array, analyzing, by the processor, the first representation for an assessment of whether the first representation is sufficient to support execution of a machine vision task by the processor, if the first representation is not sufficient, determining, by the processor, based on the first representation, a region of the image of interest for the execution of the machine vision task, reusing, by the processor, the image captured by the image sensor array to obtain a further representation of the image by directing the image sensor array to sample the image captured by the image sensor array in a manner guided by the determined region of the image of interest and by the assessment, and analyzing, by the processor, the further representation to assess whether the further representation is sufficient to support the execution of the machine vision task by implementing a procedure for the execution of the machine vision task in accordance with the further representation.

In accordance with another aspect of the disclosure, a machine vision method includes obtaining, by a processor, a subsampled representation of an image captured by an image sensor array, the subsampled representation having a first resolution, analyzing, by the processor, the subsampled representation to assess whether the subsampled representation is sufficient to support execution of a machine vision task by the processor, if the subsampled representation is not sufficient, determining, by the processor, based on the subsampled representation, a region of the image of interest for the execution of the machine vision task, reusing, by the processor, the image captured by the image sensor array to obtain a further representation of the determined region of the image by directing the image sensor array to sample the image captured by the image sensor array at a second resolution in the determined region of the image, the second resolution being higher than the first resolution, and analyzing, by the processor, the further representation of the determined region to assess whether the further representation is sufficient to support the execution of the machine vision task by implementing a procedure for the execution of the machine vision task in accordance with the further representation.

In accordance with yet another aspect of the disclosure, a machine vision system includes an image sensor including an array of logarithmic pixels, each logarithmic pixel of the array being configured to provide an output exhibiting gamma compression and an averaging circuit coupled to the image sensor, the averaging circuit being configured to subsample the outputs of the array of logarithmic pixels, an image sensor processor coupled to the averaging circuit, the image sensor processor being configured to process the subsampled outputs in accordance with a deep neural network, and a host processor configured to implement a machine vision task based on data provided via the image sensor processor.

In connection with any one of the aforementioned aspects, the electrodes, systems, and/or methods described herein may alternatively or additionally include or involve any combination of one or more of the following aspects or features. Determining the region of the image, reusing the image, and analyzing the further representation are repeated until the further representation is sufficient to support the execution of the machine vision task. Reusing the image includes directing the image sensor array to sample the image at a different resolution relative to the first representation. Reusing the image includes directing the image sensor array to sample the image at a different location relative to the first representation. Reusing the image includes directing the image sensor array to sample the image such that the first representation and the further representation differ in image size or image shape. Determining the region of the image, reusing the image, and analyzing the further representation are repeated until the further representation is sufficient to support the execution of the machine vision task. The machine vision method further includes directing the image sensor array to increase the second resolution between repeated instances of reusing the image. Analyzing the subsampled representation to assess whether the subsampled representation is sufficient includes implementing, by the processor, the procedure configured to execute the machine vision task, the subsampled representation being an input to the procedure. The procedure is configured to generate a confidence level in connection with the execution of the machine vision task. The subsampled representation is sufficient if the confidence level reaches a threshold confidence level. Determining the region of interest includes assigning a value to each data element in the subsampled representation, the value being indicative of relevance to the machine vision task, estimating a rate of change for each data element in the subsampled representation, calculating, for each data element, an importance scalar as a function of the assigned value and the estimated rate of change, and generating a map of the subsampled representation based on whether the calculated importance reaches a threshold. The procedure and the machine vision task are configured to characterize an object within the region of interest. Reusing the image includes sending, by the processor, to a decoder of the image sensor array, a command specifying the determined region. Reusing the image includes directing, by the processor, a parallel readout of the image sensor array, to provide the further representation of the determined region. The machine vision method further includes establishing, by the processor, a subsampling level for the subsampled representation based on a size of an object in the region of interest. The machine vision method further includes obtaining, by the processor, an initial subsampled representation of the image at a resolution lower than the first resolution, and determining, by the processor, the size of the object of interest based on the initial subsampled representation. The machine vision method further includes estimating, by the processor, a velocity of an object in the region of interest and a future location of the object of interest based on the estimated velocity, and applying, by the processor, the estimated future location in connection with obtaining a representation of a subsequent image frame captured by the image sensor array. The processor is configured to implement an auto-encoder and a classifier cascaded with the auto-encoder. Determining the region of interest includes processing the subsampled representation with the auto-encoder and the classifier to determine an importance map for the subsampled representation for the machine vision task, the importance map including a respective importance level for each pixel of the subsampled representation. Determining the region further includes discarding each pixel of the subsampled representation for which the importance level is below a threshold, and determining bits of each non-discarded pixel of the subsampled representation that provide accuracy and encoding length. The machine vision method further includes capturing, with logarithmic pixels of the image sensor array, the image, each logarithmic pixel providing an output exhibiting gamma compression, and subsampling, with an averaging circuit coupled to the image sensor array, the outputs of the logarithmic pixels, the averaging circuit being configured to implement pixel binning. The machine vision method further includes processing the subsampled outputs in accordance with a deep neural network. Processing the subsampled outputs in accordance with a deep neural network is implemented by the processor. The processor is an image sensor processor. The image sensor processor is integrated with the image sensor. The image sensor further includes a digital readout stage to support communications with the host processor, and the averaging circuit is an analog circuit disposed upstream of the digital readout stage. The averaging circuit includes a plurality of analog readout capacitors coupled to the array of logarithmic pixels, and the digital readout stage includes a plurality of analog-to-digital converters coupled to the plurality of analog readout capacitors.

BRIEF DESCRIPTION OF THE DRAWING FIGURES

For a more complete understanding of the disclosure, reference should be made to the following detailed description and accompanying drawing figures, in which like reference numerals identify like elements in the figures.

The embodiments of the disclosed systems and methods may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION OF THE DISCLOSURE

Methods and systems of machine vision are described. The disclosed methods and systems provide digital foveation for energy efficient machine vision applications. The digital foveation of the disclosed methods and systems may include or involve a multi-round process with bidirectional information flow between camera hardware and analysis procedures. The multiple rounds may present a series of image captures, each guided based on analysis of prior captures. Energy consumption may accordingly be optimized or otherwise improved, while preserving accuracy. In some cases, the disclosed methods and systems may use existing hardware mechanisms, including, for instance, row/column skipping, random access via readout circuitry, and frame preservation. In these and other ways, the digital foveation of the disclosed methods and systems is adaptable to, and compatible with, various imaging hardware and machine vision tasks. Although even greater benefits may be attainable via hardware modifications such as the use of focusing machines, the disclosed methods and systems achieve large reductions in energy consumption without requiring such changes.

Multiple aspects of the disclosed methods and systems are directed to transmitting and/or processing only the important or relevant parts of a scene under consideration. These aspects are useful across a wide range of embedded machine vision applications and enable large improvements in energy efficiency. For example, in an embedded license plate recognition vision application, use of the disclosed methods and systems reduced system energy consumption by 81.3% with at most 0.65% reduction in accuracy. Such significant reduction in energy consumption in machine vision tasks without a detrimental decrease in accuracy may be achieved through procedures implemented in, e.g., hardware-dependent firmware.

The disclosed methods and systems present an adaptive framework that uses energy-efficient techniques to adaptively gather problem-specific information in a multi-round process, allowing efficient analysis without degrading accuracy. The disclosed methods and systems may dynamically vary the regions and resolutions transmitted by the camera under guidance by multi-round image analysis.

The digital foveation of the disclosed methods and systems is inspired by the foveated, variable-resolution of biological vision systems. In human vision, the retina uses a central, dense sensing region called the fovea for high-resolution capture of a small portion of the scene; while a sparse, peripheral sensing region captures the rest of the image at low resolution. The low-resolution data are used for detecting regions of interest and generating oculomotory feedback. This allows the fovea to be directed, sequentially, to regions of interest, while efficiently building scene understanding. By using broad, coarse sampling to detect regions of interest and narrow, high-resolution sampling at the fovea, the optical sensory system reduces throughput across the vision pipeline, thus enabling efficient analysis.

In one aspect, the digital foveation of the disclosed methods and systems discards information irrelevant to the analysis algorithm, while preserving details, in an application-oriented manner. For instance, the disclosed methods and systems may gather images at varying resolutions. Under guidance by analysis of the low-resolution data, the disclosed methods and systems may determine corresponding locations for application-oriented transmission and processing. For instance, low-resolution, uniformly sampled captures are used to enable identification of regions of interest. In subsequent rounds, the camera captures or provides higher-resolution images in these regions. Varying the resolutions of image regions to reduce camera and analysis energy consumption across the imaging pipeline requires minimal or no changes to camera hardware. Multi-resolution, multi-round analysis is accordingly enabled without involving hardware modifications.

The disclosed methods and systems are capable of producing large improvements in the practicality and lifespans of a broad range of battery-powered machine vision systems. Although described in connection with such systems, the disclosed methods and systems may be applied to any machine vision application, including those for which power consumption is not a primary factor. The disclosed methods and systems may provide other benefits in those and other cases. For instance, the efficiency improvements effected by the disclosed methods and systems may also result in faster processing, the use of less complex (e.g., less expensive) processing components, and/or reduced memory requirements. The disclosed methods and systems are useful in a wide range of vision applications, including, for instance, any machine vision application for which it is possible to productively guide later sampling strategies by using information gathered in prior samples.

Using sparse sampling for detection of regions of interest can result in removal of important information. Thus, the subsampling routine used may be capable of determining an ideal resolution to optimize energy consumption under an accuracy constraint. To this end, the digital foveation of the disclosed methods and systems may use object size as a metric to adaptively determine the ideal subsampling levels for a given input, thereby meeting accuracy constraints. For example, the disclosed methods and systems may establish that the same number of pixels are used to accurately classify an object regardless of its original scaling.

Figure 1:
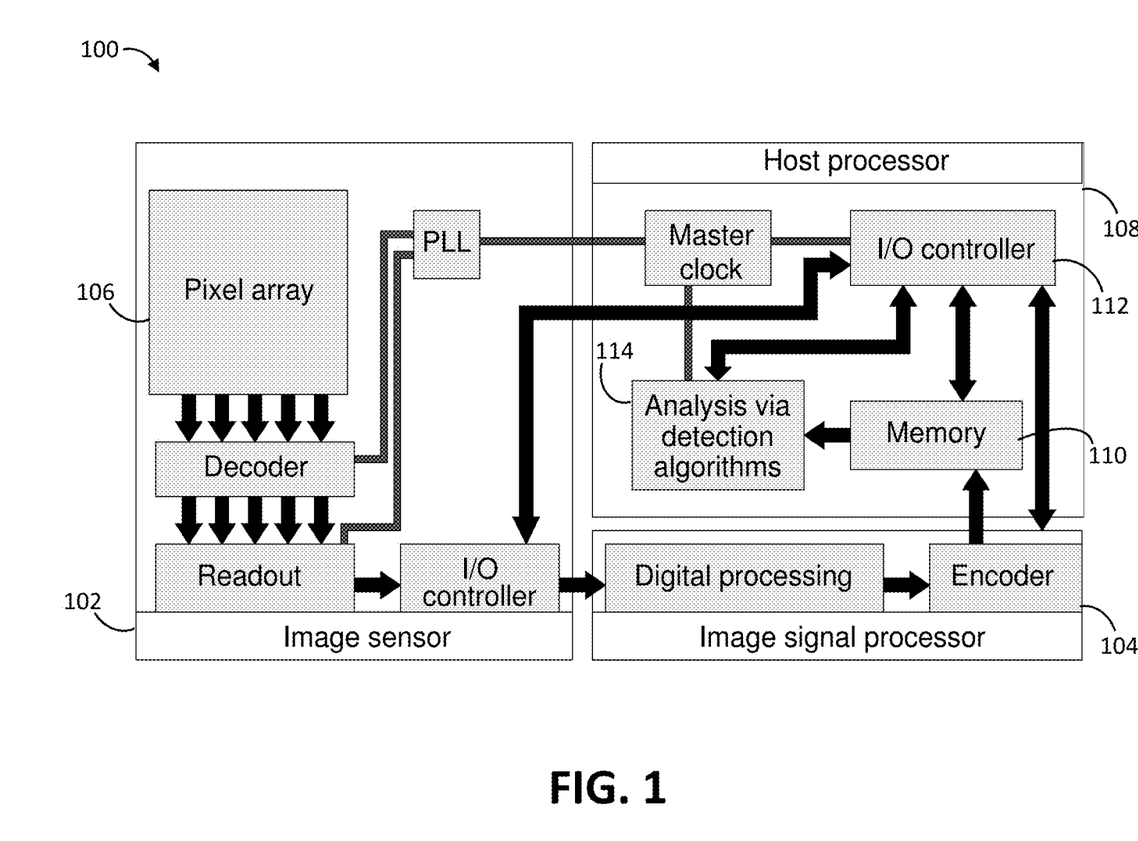
FIG. 1 is a schematic diagram of a machine vision system configured to implement digital foveation in accordance with one example.

FIG. 1 depicts a machine vision system 100 having an image analysis pipeline. One or more aspects of the image analysis pipeline may support the implementation of the digital foveation of the disclosed methods and systems. In some cases, the image analysis pipeline may be modified as described herein. In the system 100, an image sensor 102 and an analog-to-digital converter (ADC) convert incident light to digital data. An image signal processor (ISP) 104 then denoises and demosaics the data. A host (or application) processor performs image analysis.

The system includes an image sensor 102 configured for capturing incoming or incident light. The image sensor 102 may include a two-dimensional or other array 106 of pixels for sensing the incoming light. The image sensor 102 may be configured to generate analog signals indicative of the incident light. The imaging pipeline may start at the image sensor 102. The image sensor 102 may include a shutter to control exposure duration, which may be adjusted to improve the signal-to-noise ratio, and a number of other components to facilitate the capturing and sensing of the incident light.

The image sensor 102 may include one or more access circuits to acquire pixel values and perform other operations or functions. For example, the access circuit may perform calibration operations, such as analog black level calibration.

Digital data is ultimately transferred to a host processor 108 of the system 100. The analog signal chain and readout circuitry are the most power-intensive components in the sensing stage, consuming 70%-80% of the power. Energy consumed in the readout chain is related to the readout rates of sensors. Readout chain energy consumption is proportional to time. The system 100 may use the mobile industry processor interface (MIPI) standard for internal communication within the imaging pipeline.

The system 100 includes the image signal processor (ISP) 104 for digital processing. The sensor 102 communicates with the ISP 194 for digital processing. The ISP 104 may process the image, which may have a Bayer-pattern morphology, in one or more ways. For instance, the ISP 104 may demosaic the image, producing a "RAW-RGB," "RAW-YUV," or other image format. The ISP 104 may then encode the digital data into a standard, compressed format, e.g., JPEG, via an encoder pipeline in the ISP 104.

The host processor 108 is programmable or otherwise configured to provide machine vision focused processing. After the digital processing of the ISP 104, the image data (e.g., compressed image data) is stored in local or remote memory 110 of (or associated with) the host processor 108. The host processor 108 may perform one or more machine vision tasks on the captured frame. In this example, the host processor 108 uses an I/O controller 112 to sense interrupts, configure registers, and control the pipeline during frame capture.

The configuration of the host processor 108 may vary. For instance, the digital foveation of the disclosed methods and systems may be used in systems having a graphics processing unit (GPU), one or more field programmable gate arrays (FPGAs), and/or a central processing unit (CPU). The host processor 108 may include any one or more of these processing units or processors.

In some cases, digital signal processing at the ISP 104 and image analysis at the host processor 108 account for 90%-95% of the total energy. Therefore, the disclosed methods and systems may dramatically reduce energy consumption by reducing data per analysis task as described herein.

The host processor 108 may implement one or more digital foveation techniques for the machine vision system 100 via one or more analysis and/or detection algorithms or other procedures. In the example of FIG. 1, one or more instructions sets 114 for the detection procedures are stored in the memory 110 and/or another memory of the host processor 108. The digital foveation techniques incorporate a multi-round, spatially varying-resolution imaging approach into the execution of machine vision tasks. The digital foveation techniques may adapt resolutions and sensed areas in accordance with image analysis, as described herein. The digital foveation techniques may use low-resolution images for detecting regions of interest and high-resolution images to examine those regions in detail.

Figure 2:
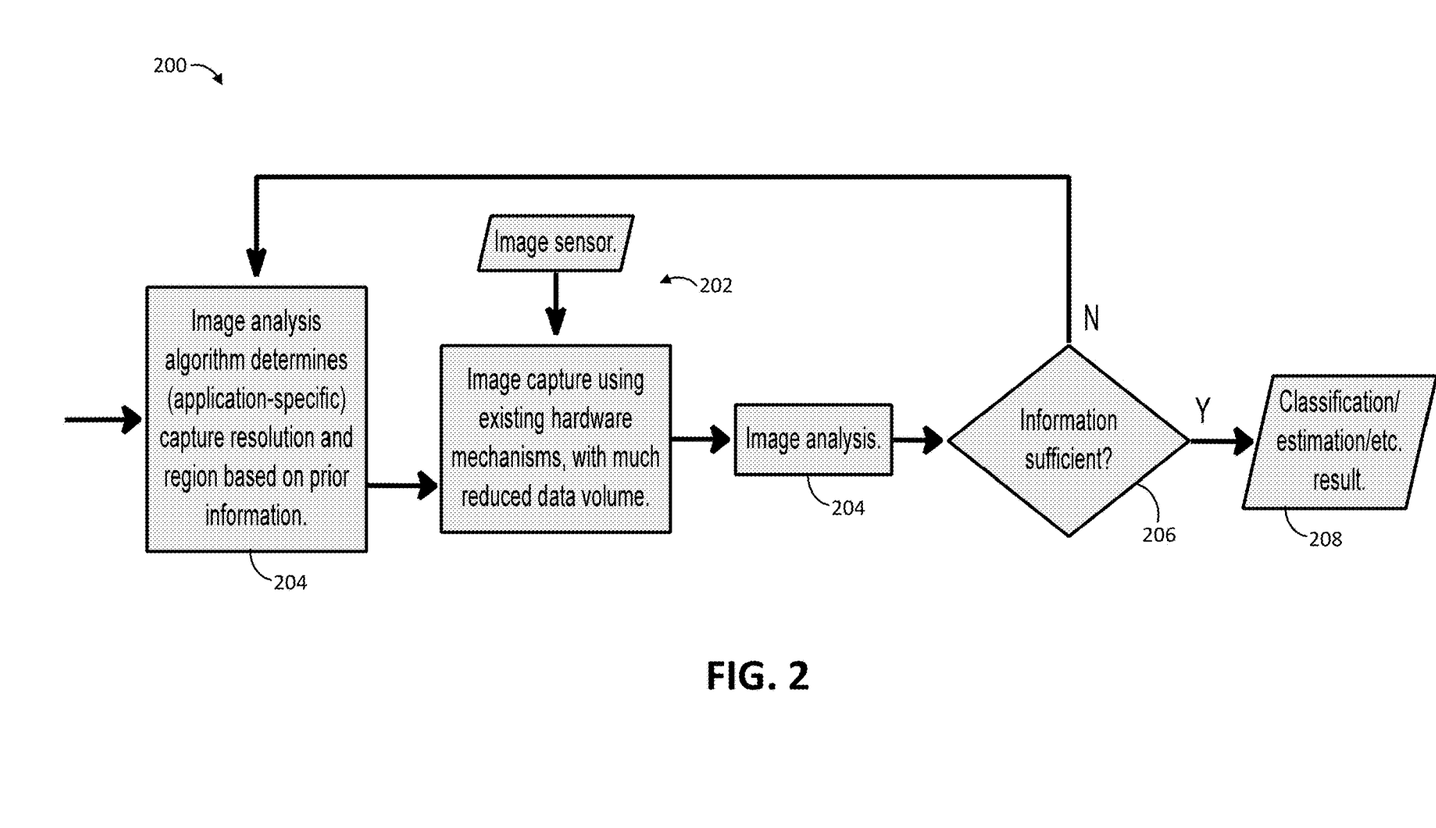
FIG. 2 is a flow diagram of a machine vision method for implementation of digital foveation in accordance with one example.

FIG. 2 depicts a machine vision method 200 that implements one example of digital foveation. In this example, each round in the process includes image sensing 202 under control of an application-specific analysis procedure 204. The resolution and bounding box(es) of the image(s) are specified by the algorithm or procedure 204, generally producing much less data than a high-resolution, full-scene image. The analysis procedure 204 then determines in a decision block 206 whether enough information is available to complete the assigned task with adequate accuracy. If not, it guides the next round based on the information gathered in previous rounds. If enough information is available, then the assigned task is completed via implementation of a classification, estimation, or other procedure 208.

Figure 3:
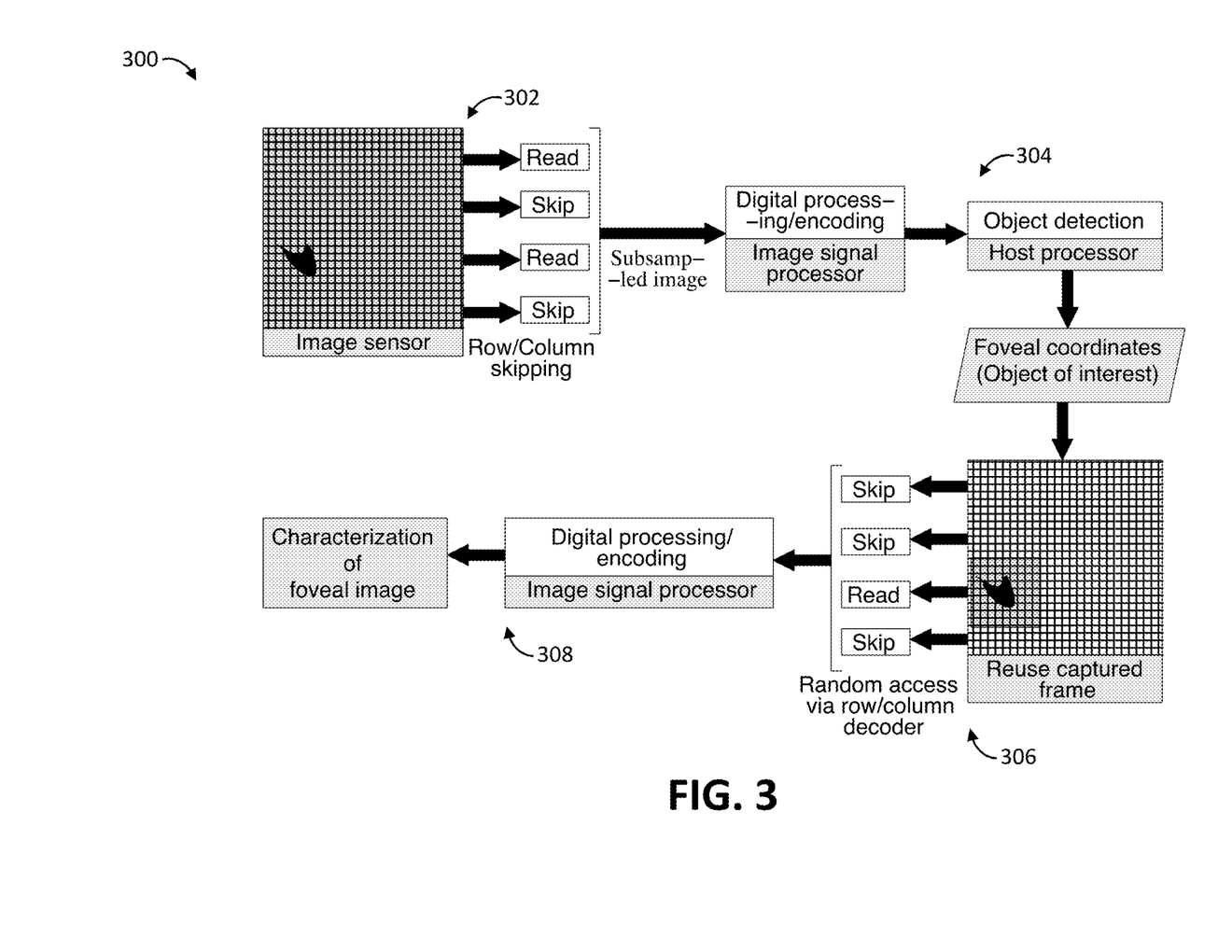
FIG. 3 is a schematic diagram of an image processing pipeline for implementation of digital foveation by the system of FIG. 1, the method of FIG. 2, and/or another system or method, in accordance with one example.

FIG. 3 depicts an example of a machine vision imaging processing pipeline or method 300 with a two-round process. The method 300 begins with one or more sensing acts 302 and uses existing subsampling mechanisms to produce low-resolution images, which are used to determine locations of regions of interest in one or more acts 304. The vectors bounding the areas of interest may be considered the foveal coordinates, while the bounding box may be considered a digital fovea. The foveal coordinates are provided as feedback to the sensor, which outputs higher-resolution captures of those regions in one or more acts 306. Unlike conventional foveal imaging, the method 300 implements fully electronic changes to the position, size, and resolution of the digital fovea, without using mechanical components, such as gimbals. There is accordingly also no reliance on custom (and scarce) image processing algorithms designed for foveated sensors.

The digital foveation of the disclosed methods and systems use a multi-round detection approach that avoids wasteful pixel sensing, data transfer, and analysis. The digital foveation enables large reductions in data transfer and processing times (e.g., 70%-75%) and energy consumptions (e.g., 75%-85%). These improvements may be attained by the digital foveation using existing sensing mechanisms. The multi-round algorithmic framework may thus be integrated with existing hardware components.

As shown in FIG. 3, a region of interest may be located using low-resolution subsampled captures. The region of interest may then be analyzed using high-resolution captures in one or more acts 308. Existing camera hardware mechanisms may accordingly be used to optimize or otherwise improve energy consumption, while maintaining compliance with an accuracy constraint.

Further details regarding the determination of the foveal coordinates and image subsampling are now provided in connection with one example. The image sensor may produce lower resolution images (e.g., lower than its maximum resolution) by subsampling, such as, for example, row/column skipping and pixel binning. Pixel binning uses additional capacitive circuitry to average pixel values within a rectangular region, e.g., producing a single red/green/blue tuple. The pixel binning reduces aliasing and improves signal-to-noise ratio by using additional averaging circuitry, at the cost of some increase in sensor power consumption. Row/column skipping ignores selected rows/columns and involves no additional hardware. The image sensor (e.g., a CMOS image sensor) may further disable one or more parts of its readout circuitry (such as, row/column decoders and ADCs) to reduce energy consumption at the subsampling stage.

The foveal capture may involve one or more commands sent to the image sensor array. The image sensor may be responsive to such commands or otherwise configured to allow selective access (e.g., random access) to pixel arrays by using parallel readout and row/column decoders. Image sensors, such as ON Semiconductor's NOII4SM6600AD image sensor, set readout registers that output specific rectangular windows using this feature. The row/column skipping mechanism for image subsampling may be implemented using this image sensor feature, too. The rectangular window capture mechanism may thus be used to extract a high-resolution image of the regions of interest.

As shown in FIG. 3, the high-resolution image is extracted in the act(s) 306 by reusing the captured frame. The image sensor stores the captured frame in the pixel array, discarding the captured frame only when the pipeline is reinitiated via another capture event. This permits rapid wakeup and readout of the same image signal, significantly benefiting the multi-round analysis framework. The sensed data may thus be read again instead of capturing another frame.

The disclosed methods and systems may be configured to take into account the size of the object of interest. The disclosed methods and systems may be calibrated so that accuracy reductions resulting from subsampling a small object are avoided. If positions and orientations are constrained such that objects of interest will occupy a similar number of pixels in the captured images, a single statically set (or other predetermined) subsampling level may be adequate to optimize energy-accuracy properties. An example of a machine vision application of this type is license plate recognition. The disclosed methods and systems may alternatively or additionally be configured to dynamically select subsampling resolutions to accommodate situations when the objects of interest will occupy different pixel counts in different images. An example of a machine vision application of this type is face detection or recognition.

The digital foveation of the disclosed methods and systems may also be applied to video-based or other multi-frame machine vision applications. Digital foveation may be adapted to these applications by analyzing a low-resolution frame for object detection, and thereafter estimating object velocities and future object locations using the incoming low-resolution buffer frames.

A framework or technique for detecting regions of interest in accordance with one example is now described. The region detection technique may be used in conjunction with, or implemented by, one or more of the methods or systems described herein, or another method or system. A region of interest or importance may be a region having a high or otherwise substantial impact on inference accuracy. In video cases, a region of interest or importance may be a region having such an impact as well as changing relatively rapidly. In some cases, a compressive sensing related framework is used to detect the objects of interest. The framework exploits application-awareness as a prior to optimize sampling, thereby reducing memory requirements and communication requirements, while increasing efficiency and maintaining accuracy. The framework uses a cascaded autoencoder-application network architecture to determine the importance of a sample to the given application (machine vision task). Pixels irrelevant or redundant for achieving high accuracy may be discarded. Further, due to the sparsity of natural images, pixels form clusters with similar probability distributions, which may be considered "typical distributions". These clusters are skewed towards one or more intensity values and not uniformly distributed. Assigning eight bits to such pixels is wasteful, for their intensity distributions are capable of being reconstructed using fewer, but more relevant, bits. The framework uses a search procedure to assign appropriate bits to such clusters, while ensuring minimal reconstruction error. The framework may thus achieve high compression ratios and high quality results. For example, one application of the framework reduced data volume by 77.37%, reduced signal communication latency and accompanying energy consumption by 64.6%, and attained classification accuracy similar (<0.32% loss) to that of the uniformly sampled images.

The technique is an application-aware, compressive sensing related framework that minimizes data volume by discarding irrelevant pixels and optimizing bit representations of the remaining pixels, while preserving decision quality. This results in reduced memory and throughput requirements. Information important to the machine vision task is maintained, resulting in minimal to no degradation in accuracy (<1%). Furthermore, adaptive bit assignment is used to decrease sampled and analyzed data by 75-85%.

The technique is an autoencoder-based application-aware compressive sensing framework that optimizes sensing patterns to minimize sampled data with minimal reduction in accuracy. This results in reduced data throughput and memory requirements, which are especially important in emerging battery-powered wireless embedded applications. The technique either discards a pixel or optimizes its bit representation by skipping relatively unimportant bits.

The technique may be used to calculate or otherwise determine pixel importance to the overall analysis (e.g., the machine vision task or application). The latent space generated by an autoencoder encodes structural information about the data, which is used as an inherent prior by the technique. Classification and regression tasks trained on the latent space of an autoencoder are accurate if the model family incorporates the data generating distribution, e.g., a neural network classifier trained on the latent space of an example autoencoder has 98.8% accuracy.

Training two networks simultaneously, where one is able to fit the data generating distribution of the input, results in a regularization effect on the other. Thus, the autoencoder is cascaded with the application network, i.e., a network designed to draw inferences on the dataset. The loss function and gradients back-propagate from the application network directly and impose a constraint on the latent space of the autoencoder, forcing it to learn a representation that retains only features crucial to the application. The imposition of a relevance constraint may be used to infer the importance of individual pixels. For example, the magnitudes of weights corresponding to connections between the input and the first hidden layers may be used to assign importance factors to pixels.

For example, an autoencoder A may have n hidden neurons in its first hidden layer. The autoencoder is trained on a given dataset of input size m×n, alongside an application network N. Thus, each of the n neurons has mn connections to the input layer. The absolute values of the mn weights are normalized for each neuron to a scale of [0, 1]. If a pixel is important (has a large weight) to any hidden neuron, it is useful to the activation of that neuron and is therefore retained. The importance factor of the pixel corresponding to index (i, j) is calculated as follows:

$$IF_{i,j} = \max_{1 \leq k \leq n} \text{abs}(weight_{normalized}(h_{i,j,k}))$$

where $weight_{normalized}(h_{i,j,k})$ denotes the normalized weight corresponding to the connection between the (i, j)$^{th}$ pixel and kth neuron.

An importance matrix, M, is used to generate an importance map. A map is defined as $M_{i,j}=IF_{i,j}$.

Adaptive bit assignment. Natural images are generally sparse, resulting in minimal variation in the statistics of groups of (often spatially local) pixels. For example, if the chosen imaging setup resulted in regions of darkness at certain locations, the typical distribution of those pixels will be skewed towards 0. Assignment of eight bits to such pixels is wasteful, for the pixels may be well represented using fewer and low-significance bits. Other spatial scene properties common in embedded applications have similar implications, e.g., some regions are more relevant to classification than others.

Each pixel $P_{i,j}$ is a random variable in range [0, 255]. According to the asymptotic equipartition theorem and weak law of large numbers, if n random variables are drawn from an i.i.d. distribution, the resulting series of variables may be used to infer that exact probability distribution. Thus, the pixels across the dataset at location (i, j) may be assumed to be random variables drawn in an i.i.d. manner from the original probability distribution of the pixel $P_{i,j}$. If the dataset is large enough, the original probability distribution of P, may be accurately inferred and is considered the "typical distribution".

To determine a set of pixels with similar typical distributions, an unsupervised neural network clustering is used to map pixels to categories. Typical distributions of each category are averaged to determine the category's representative probability distribution.

To find the ideal bit assignment for pixels corresponding to a particular category, a greedy search across the available bit resolution (e.g., eight bits for images) is used and the representative distribution of that category is reconstructed. The search process identifies the minimal set of bits honoring the following reconstruction bound:

$$\min\left(\sum_{I=1}^{255} P_{category}(I)(I_{1-8} - I_{rep})\right)$$

where $P_{category}(I)$ is the probability with which pixels in that particular category are assigned an intensity value of I; while $I_{rep}$ is the reconstruction of I using the bit-representation "rep". The summation starts from 1 because intensity 0 may be represented by any bit representation. The representations and their corresponding errors are stored in an array.

Segregation into importance sets. Because the pixels belonging to a category need not share the same importance, a different reconstruction error is adaptively assigned to each pixel, based on its importance to the application network. The importance map, M, is used to segregate the pixels into importance sets by considering the relationship between error and accuracy. The importance map is used to create the mask associated with an importance threshold, T (Mask=M≥T).

The pixel sets associated with several importance thresholds are used to define classes that are used to optimize the bit representations. In practice, only a few such thresholds are necessary to achieve high accuracy. Thresholds may be determined via the following heuristic.

The threshold is incrementally decreased from 1 to 0. At each step, the test images are multiplied with the mask and evaluated for network accuracy on the application network. The accuracy may be plotted as a function of importance thresholds. As the threshold reduces, there are accuracy plateaus, i.e., regions in which small further decreases in the importance threshold do not improve accuracy. This implies that pixels corresponding to features of a particular structure type have been used; further improvements in accuracy may involve additional features expected by the network. These may be considered saturation points and pixels ranging between two saturation points may be assigned to a single importance set. Importance sets corresponding to higher importance factors are assigned a smaller reconstruction error (e.g., <5%).

Training. The network is first trained in the cascaded structure. Then, each pixel is assigned a category for bit representation and an importance set. For fine tuning, the autoencoder is removed and the application network is independently trained. Training is done in rounds, corresponding to each saturation point, and terminates when accuracy ceases to increase. Example applications of the technique have demonstrated that fine-tuning corresponding to just the first saturation point, i.e., the most important pixels, results in network accuracy within <1% of the network trained on uncompressed, uniformly sampled images. Thus, multiple training rounds may not be warranted.

While the digital foveation of the disclosed methods and systems does not require hardware modifications to the image processing pipeline, the disclosed methods and systems may nonetheless incorporate one or more hardware modifications. For example, one or more modifications may be directed to establishing a deep learning accelerator in or near (i.e., at) the image sensor. Examples of a deep learning accelerator and/or other minimalistic image signal processing for machine vision applications are described below.

In-sensor and near-sensor energy-efficient deep learning accelerators have the capability to enable the use of deep neural networks in embedded vision applications. However, their negative impact on accuracy has been severely underestimated. The inference pipeline used in prior in-sensor deep learning accelerators bypasses the image signal processor (ISP), thereby disrupting the conventional vision pipeline and undermining accuracy. For example, the detection accuracy of an off-the-shelf Faster R-CNN algorithm in a vehicle detection scenario reduces accuracy by 60%.

To make deep learning accelerators practical and useful, examples of an energy-efficient accelerator are described below. Operation of the accelerator yields most of the benefits of an ISP and reduce covariate shift between the training (ISP processed images) and test (RAW images) data. For example, in a vehicle detection application, the operation improved accuracy by 25-60%. Relative to the conventional ISP pipeline, energy consumption and response time improved by 30% and 34%, respectively.

Figure 4:
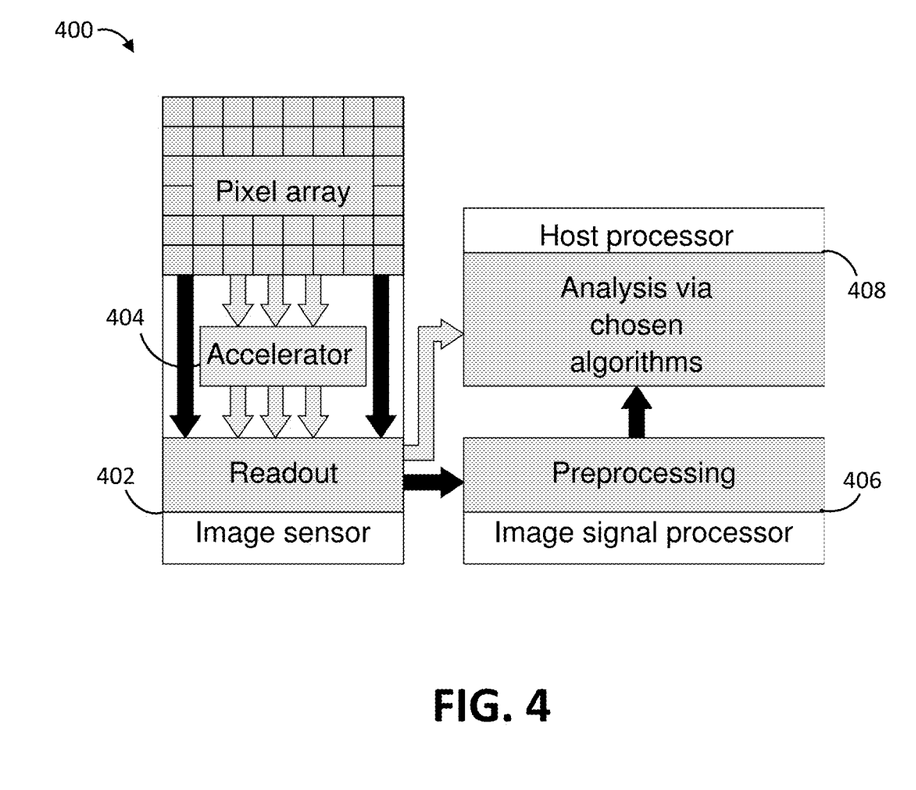
FIG. 4 is a schematic diagram of a machine vision system configured to implement digital foveation and/or other machine vision procedures with an accelerator or other processor at an image sensor in accordance with one example.

FIG. 4 depicts a machine vision system 400 with an image sensor 402 having an accelerator 404 in accordance with one example. As described above, an energy-intensive but accurate imaging pipeline uses an image signal processor (ISP) 406 to perform several non-linear transformation operations on an image before further analysis, e.g., by a host processor 408. In contrast, the in-sensor accelerator 404 (and other accelerators at the image sensor) bypass the ISP 406, as shown in FIG. 4. Without the benefit of the operations described below, the imaging pipeline would accordingly be disrupted, undermining accuracy.

Deep neural networks are typically trained on images already processed by the ISP 406. As a result, deep neural networks learn distributions that differ from those of the RAW images produced by the image sensor 402. Previous in-sensor accelerator designs have neglected the existence of the ISP 406 and provided accuracy results using publicly available image datasets that had already been transformed by the ISP 406. This has resulted in large overestimates of accuracy and/or analysis efficiency in prior work. This issue of disparity in training (ISP processed images) and test (RAWimages) data distributions is typically known as covariate shift.

The system 400 (and, more generally, one or more of the other methods and systems described herein) may avoid the above-referenced errors with an image signal processing pipeline that improves the accuracy of near-sensor accelerators using deep neural networks trained on conventional, ISP-processed datasets. These aspects of the disclosed methods and systems may be integrated within the image sensor 402, eliminating the need for an ISP. These aspects of the disclosed methods and systems make in-sensor accelerators 404 feasible by performing one or more non-linear preprocessing operations. Accuracy may thus be maintained while eliminating the ISP, thereby improving detection accuracy by 25-60% and reducing system response time by 34% and system energy 30% in ISP retaining near-sensor accelerators.

The system 400 and/or the other disclosed methods and systems (e.g., those described elsewhere herein) may thus use a machine vision pipeline that includes three stages. The first stage is a sensing stage, in which the image sensor 402 is responsible for sampling and uses photodiodes to convert incoming photons to proportional voltage levels. Three or more transistors are used to reset, read, and amplify the captured voltage. To minimize the fixed pattern noise, image sensors use correlated double sampling. This makes noise-sensitive pixel architectures, such as logarithmic pixels, feasible. Images outputted by the image sensor are known as RAW images and are discontinuous as a result of using color filter arrays (CFA) to capture the red, green, and blue intensities separately (see FIG. 2a).

The second stage is a preprocessing stage. The preprocessing may take place at the ISP 406. These operations may aim at improving the image aesthetics and are often proprietary to manufacturers. The pipelines may include several operations, such as demosaicing, the conversion of the discontinuous, single-channel RAW image to a continuous, three-channel, RGB image. The RAW images may be converted into a standardized format, such as JPEG or PNG.

The third stage is an inference stage, in which the host processor 408 (and/or other processor) executes application-specific procedures for detection, classification, and other machine vision tasks.

The system 400 of FIG. 4 depicts an example of a system having an image processing pipeline modified by the in-sensor accelerator 404 or other accelerator at the image sensor 402. The in-sensor accelerator 404 modifies the above-described pipeline by executing convolutional operations within (or otherwise at) the image sensor 402 itself. The resulting features are then processed by the host processor 408. However, since training and test data in this setup differ, these features do not follow the distributions learnt by deep neural networks. This results in severe covariate shift between the training (ISP processed images) and test (RAW images) data, significantly reducing application accuracy.

The system 400 and/or the other disclosed methods and systems (e.g., those described elsewhere herein) address this challenge arising from the use of an accelerator 404 at the image sensor 402 by effectively preprocessing the images before application to a deep neural network of the accelerator 404. For instance, pixel binning and/or another smoothening procedure may be implemented to remove tiling effects of a color filter array of the image sensor, as described below. The accelerator 404 therefore operates as intended. The processing of the deep neural network of the accelerator 404 may be directed to preprocessing of the image data before image analysis by the host processor 408 or be directed to the image analysis to any desired extent.

Because a RAW and ISP-processed image correspond to the same scene, they both capture the scene structure and geometry. Their major differences are due to transformation procedures such as gamma compression, which alter the data generating distribution of pixels. Because machine vision procedures are trained on ISP-processed images, the procedures learn representations based on the transformed data generating distribution.

Rather than train the network on RAW images directly (which may be problematic due to RAW image datasets unavailability, non-standardization, and proprietary conversion techniques), the disclosed methods and systems instead modify the image signal processing pipeline to approximate the data generating distribution of ISP-processed images. In some cases, the modifications use gamma compression and pixel binning to approximate the data generating distribution of ISP-processed images. The modification(s) reduce the amount of covariate shift between the ISP processed (training) and RAW images (test), thereby enabling the use of off-the-shelf DNNs in in-sensor, near-sensor, and other accelerators at the image sensor.

In some cases, gamma compression is used to approximate the ISP-processed intensity distribution. Gamma compression is a local, non-linear transformation that exponentiates individual pixels.

In some cases, pixel binning is used for smoothening. Pixel binning is a subsampling scheme that includes an averaging operation followed by decimation. Because averaging removes Gaussian noise, binning results in noise reduction too. Binning the gamma compressed image results in denoising and produces a smooth intensity distribution. Pixel binning also has another benefit. Pixel binning reduces the image size by subsampling, thus enabling more efficient analysis. Because DNN-based object detection algorithms use small convolutional kernels, high-resolution images proportionately increase processing time and energy.

The operations described above are useful for approximating the data generating distributions of ISP-processed images. High accuracy is achieved while enabling use of off-the-shelf DNNs for in-sensor deep learning accelerators.

An example of a technique for incorporating gamma compression and pixel binning before image sensor readout is now described. In this case, the image sensor is modified to include logarithmic pixels for the gamma compression and an averaging circuit for the pixel binning.

Image sensors use linear photodiodes to proportionately convert illumination energy into voltage. Logarithmic pixels (log-pixels) use a 3-transistor active pixel sensor that functions in the sub-threshold region, thereby achieving logarithmic response of the output voltage with respect to incident illumination energy. Log-pixel sensors consume less energy than linear pixel sensors, but are more prone to fixed pattern noise. This may be ameliorated using correlated double sampling (CDS), however. Gamma compression may be well approximated using logarithmic pixels.

Pixel binning may be provided via an analog averaging circuit at the readout stage. Specifically, the parallel readout pipeline ends in a chain of capacitors, which can be shorted for charge sharing and averaging. Pixel binning is supported by almost all modern image sensors. As it necessitates the use of additional circuitry for averaging, pixel binning results in an increase in sensor power consumption. The increase is negligible however, and because readout time decreases quadratically with the binning window length, net sensing energy is decreased.

Using the proposed pipeline, off-the-shelf deep neural networks may thus be used on RAW images.

Described above are examples of deep learning accelerators at the image sensor that enable use of off-the-shelf deep neural networks through incorporation of a minimal pre-processing pipeline. The pre-processing pipeline implements two operations, gamma compression and pixel binning, to approximate the data generating distribution of the ISP processed images. The pre-processing pipeline may be incorporated within an image sensor by using logarithmic pixels and binned readouts. The pre-processing pipeline enables the use of off-the-shelf deep neural networks in accelerators at the image sensor, while also reducing the error rate of the deep neural networks by 25-60%, and decreasing system energy consumption by 30% and analysis latency by 34%.

The above-described deep learning accelerators may be incorporated into the machine vision systems described above to provide an alternative and/or additional processing image signal processing pipeline.

Figure 5:
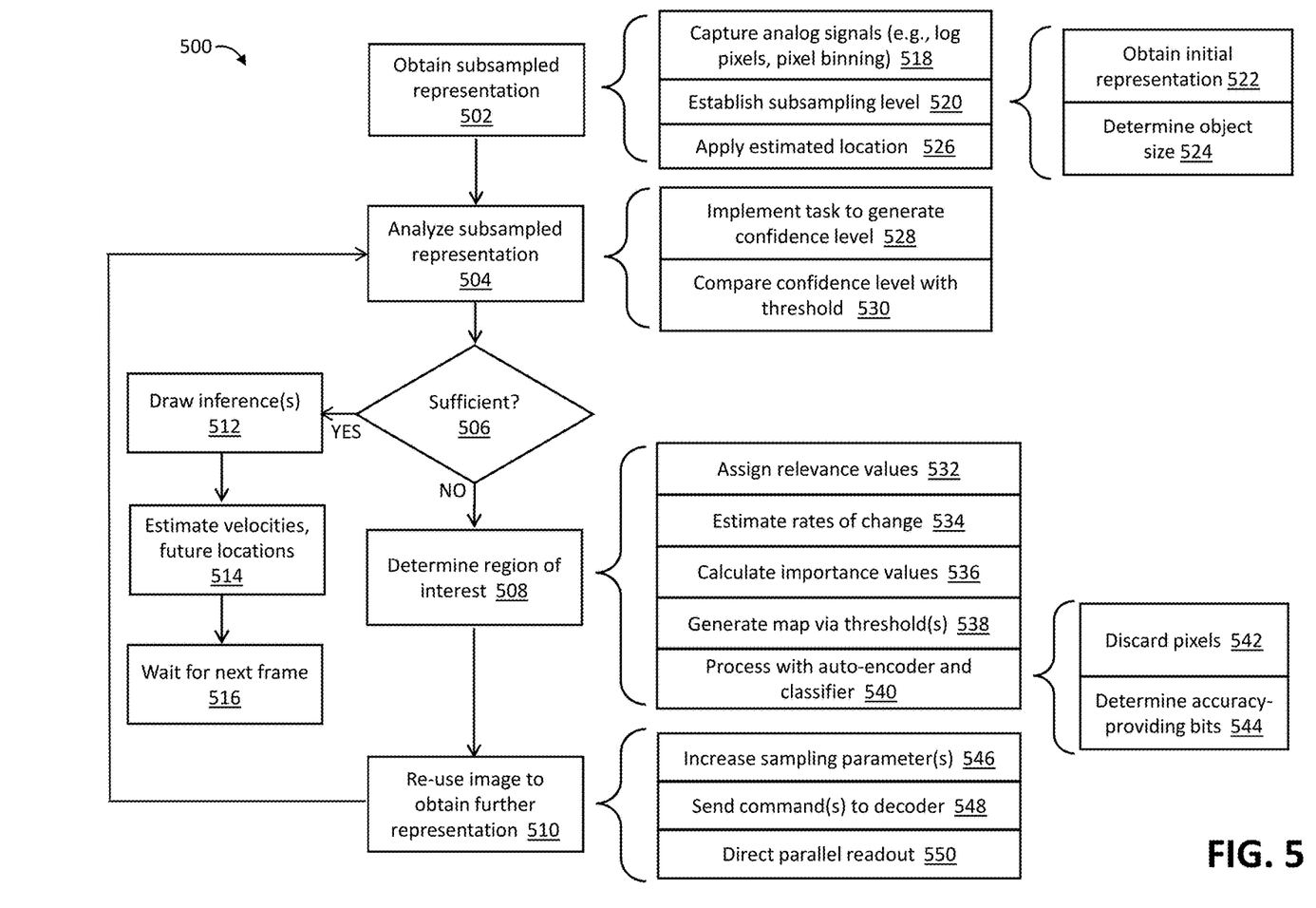
FIG. 5 is a flow diagram of a machine vision method for implementation of digital foveation in accordance with one example.

FIG. 5 depicts a machine vision method 500 in accordance with one example. The method 500 may be implemented by any one or more of the machine vision systems described above, and/or another system. In some cases, one or more acts of the method 500 may be implemented by a host processor, such as the host processors of the examples described above. Alternatively or additionally, one or more acts of the method 500 may be implemented by another processor of a machine vision system, such as a processor disposed at an image sensor, an image signal processor (ISP), or another processor.

The method 500 may begin, in an act 502, with one or more acts directed to obtaining a subsampled representation of an image captured by an image sensor array, the subsampled representation having a first resolution. The subsampled representation is then analyzed in an act 504 to assess whether the subsampled representation is sufficient to support execution of a machine vision task by the processor. In some cases, analyzing the subsampled representation to assess whether the subsampled representation is sufficient includes implementing, by the processor, the procedure configured to execute the machine vision task, the subsampled representation being an input to the procedure. A decision block 506 directs control based on the assessment. If the subsampled representation is not sufficient, a region of the image having an object of interest for the execution of the machine vision task is determined in an act 508 based on the subsampled representation. The image captured by the image sensor array is reused in an act 510 to obtain a further representation of the determined region of the image by directing the image sensor array to sample the image captured by the image sensor array at a second resolution in the determined region of the image, the second resolution being higher than the first resolution. The further representation of the determined region is then analyzed again in accordance with the act 504 to assess whether the further representation is sufficient to support the execution of the machine vision task. Whether the further representation is sufficient may be determined by implementing a procedure for the execution of the machine vision task in accordance with the further representation.

As described above, the method 500 may be implemented in a multi-round manner. In the example of FIG. 5, determining the region of the image, reusing the image, and analyzing the further representation may thus be repeated until the further representation is sufficient to support the execution of the machine vision task.

In the example of FIG. 5, once the subsampled representation is found to be sufficient, the decision block 506 directs control to an act 512 in which one or more inferences are drawn. The inference may be drawn via execution of the procedure and/or the machine vision task or as a result thereof. In some examples, the procedure and the machine vision task may be configured to classify or otherwise characterize an object within the region of interest. The nature of the inference(s) may vary. In other cases, the same procedure may be used for both the inference and the previous analysis (e.g., determining the confidence level).

In some cases, the method 500 includes one or more acts directed to preparing for the next frame or image. In the example of FIG. 5, a velocity of an object in the region of interest is estimated in an act 514. A future location of the object of interest may then be estimated based on the estimated velocity. The estimated future location may then be applied in connection with obtaining a representation of a subsequent image frame captured by the image sensor array. The future location may thus be used during a subsequent execution of the method 500 as a region of interest, or used to determine a region of interest. An initial subsampled representation may thus include one or more regions of higher resolution in accordance with the future location(s). The method 500 may include any number of additional or alternative acts while waiting for a next frame in an act 516.

The method 500 may include a number of acts directed to capturing analog signals. In the example of FIG. 5, the act 502 includes an act 518 in which analog signals are captured by an image sensor array. In some cases, the analog signals are captured by logarithmic pixels. Each logarithmic pixel provides an output exhibiting gamma compression, as described above. The image sensor may further include circuitry coupled to the image sensor array for pixel binning, such as an averaging circuit. Capturing the image signals may thus include subsampling, with the averaging circuit, the outputs of the logarithmic pixels, as described above.

The act 518 may also include one or more acts directed to calibration. For example, a subsampling level for the subsampled representation to be obtained may be established in an act 520 based on a size of an object in the region of interest. The object size may be determined in a previous iteration, as described above. Some calibration procedures may be implemented only once, e.g., in connection with the first frame. For example, an initial subsampled representation of the image may be at a resolution lower than the first resolution in an act 522. In some cases, object sizes may be determined in an act 524 based on the initial subsampled representation. Other calibration procedures may only be implemented in successive iterations. For example, an estimated location of an object of interest may be applied in an act 526 such that the representation has a higher resolution in one or more regions of the image.

In connection with analyzing the subsampled representation in the act 504, the procedure may be configured to generate in an act 528 a confidence level in connection with the execution of the machine vision task. The generated confidence level may then be compared with one or more thresholds in an act 530. For instance, the subsampled representation is then found to be sufficient if the confidence level reaches a threshold confidence level.

In connection with determining a region of interest in the act 508, a procedure may be implemented in which a value is assigned in an act 532 to each data element in the subsampled representation. The value is indicative of relevance to the machine vision task, as described herein. In some cases, the relevance determination is done by looking at the response of the network to changes in particular inputs or by examining the learned internal network weights. Relevance means that the datum has a relatively high impact on inference outcome, and therefore on inference accuracy. Alternatively or additionally, the region of interest determination is based on estimating, in an act 534, a rate of change for each data element in the subsampled representation. An importance scalar may then be calculated in an act 536 as a function of the assigned value and the estimated rate of change. In some cases, a map of the subsampled representation is then generated in an act 538 based on whether the calculated importance reaches one or more thresholds.

In some cases, the importance may and/or other region of interest determination of the act 508 may involve an auto-encoder and a classifier cascaded with the auto-encoder, as described above. In such cases, the subsampled representation may be processed in an act 540 with the auto-encoder and the classifier to determine the importance map for the subsampled representation for the machine vision task. The importance map may include data indicative of a threshold analysis or other importance level for each pixel of the subsampled representation.

The auto-encoder and the classifier may be configured to optimize the data set for further processing. For example, the processing of the auto-encoder and the classifier may further include an act 542 in which each pixel of the subsampled representation for which the importance level is below a threshold is discarded, as described above. Those bits of each non-discarded pixel of the subsampled representation that provide accuracy and encoding length may also or alternatively be determined in an act 544.

In some cases, the method 500 further includes an act 546 in which the image sensor array is directed to increase or otherwise modify the second resolution between repeated instances of reusing the image. The sampling resolution may thus be varied between rounds. In some cases, the resolution may be lowered. For instance, the first representation may include a high resolution capture of selected regions, in which one or more subsequent rounds may involve lower resolution captures. In still other cases, one or more alternative or additional sampling parameters are modified. For instance, the image sensor array may be directed to change the location, shape, size, specific pixels, color channels, and/or bits based on information gathered in prior rounds or in a training process.

The re-use of the image in the act 510 may include sending, in an act 548, one or more commands to a decoder of the image sensor array. For example, a command may specify the region of interest determined in the act 508. Alternatively or additionally, the image may be reused by directing, in an act 550, a parallel readout of the image sensor array, to provide the further representation of the determined region.

The order in which the acts of the method 500 are implemented may differ from the example shown in FIG. 5. For instance, the determination of region(s) of interest in the act 508 may be integrated with, or otherwise occur in connection or contemporaneously with the analysis of the act 504.

The method 500 may include additional, fewer or alternative acts. For instance, a number of the acts may not be implemented in applications not involving multiple frames of images. For example, the velocity estimation and future location estimation of the act 514 may not be implemented.

The disclosed methods and systems may vary from the examples described above.

For instance, the disclosed methods and systems may use a variety of techniques for finding regions of interest and/or objects of interest. Examples include motion detection, highest contrast boundaries, specific colorimetry values, and shape detection.

The disclosed methods and systems may incorporate any one or more of the following features. Determining whether the image representation is sufficient may include analysis of a lookup table of objects of interest (e.g., object aspects). Sufficiency may correlate with achieving a level of selection or match within the lookup table (e.g., that leaves only a certain number of elements in the lookup table as viable selections). Alternatively or additionally, sufficiency may be found when a process level is reached sufficient to determine one or more characteristics of an object of interest. Determining a region of interest may include a multiple-step procedure in which select object characteristics are identified, followed by an object type, then to a specific object, and finally to an identified instance of the object. Object characterization may include identifying one or more features or properties that allow class type or unique identification. In cases in which preprocessing is implemented by a processor at the image sensor, the image sensor processor may provide a full fovea understanding of the image from the sensor, or a region of interest based on an object of interest. The information may then be provided to a host computational neural network for implementation of the above-described methods. The disclosed methods may include reducing data to an edge map of the object of interest, and production of a map of the highest contrast neighboring pixels including the object of interest. The analysis of the object of interest may be utilized to extract the relative position of that object to other objects in the region of interest that are associated with the object of interest. These secondary objects may be external or within the area including the object of interest and may be used to either further identify the object of interest or extract additional characteristics of the object of interest. This may include orientation, condition, status, or intent. In one example involving a parked car with its headlights on, identifying that the headlights are on may be used to provide information at to the orientation and other characteristics of the car, such as a probability of pending motion.

The disclosed methods and systems may be useful in a variety of ways and contexts. For instance, the disclosed methods and systems may output selectable zones and levels per frame for further data reduction, control of high dynamic range (HDR) and/or signal-to-noise ratio (SNR) for low light level performance improvement, higher reliability for face/object recognition, and tracking of objects in motion.

The data reduction provided by the disclosed methods and systems for machine vision applications may result in increased system speed and faster frame rates.

The disclosed methods and systems are useful in connection with a wide variety of machine vision applications, Examples include various automation contexts, including robotics and autonomous system control, as well various image scanning contexts, including those that involve categorization or selection.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A machine vision method comprising:
    obtaining, by a processor, a first representation of an image captured by an image sensor array;
    analyzing, by the processor, the first representation for an assessment of whether the first representation is sufficient to support execution of a machine vision task by the processor;
    upon assessing that the first representation is not sufficient, determining, by the processor, based on the first representation, a region of the image of interest for the execution of the machine vision task;
    reusing, by the processor, the image captured by the image sensor array to obtain a further representation of the image by directing the image sensor array to sample the image captured by the image sensor array in a manner guided by the determined region of the image of interest and by the assessment; and
    analyzing, by the processor, the further representation to assess whether the further representation is sufficient to support the execution of the machine vision task by implementing a procedure for the execution of the machine vision task in accordance with the further representation.

2. The machine vision method of claim 1, wherein determining the region of the image, reusing the image, and analyzing the further representation are repeated until the further representation is sufficient to support the execution of the machine vision task.

3. The machine vision method of claim 1, wherein reusing the image comprises directing the image sensor array to sample the image at a different resolution relative to the first representation.

4. The machine vision method of claim 1, wherein reusing the image comprises directing the image sensor array to sample the image at a different location relative to the first representation.

5. The machine vision method of claim 1, wherein reusing the image comprises directing the image sensor array to sample the image such that the first representation and the further representation differ in image size or image shape.

6. A machine vision method comprising:
    obtaining, by a processor, a subsampled representation of an image captured by an image sensor array, the subsampled representation having a first resolution;
    analyzing, by the processor, the subsampled representation to assess whether the subsampled representation is sufficient to support execution of a machine vision task by the processor;
    upon assessing that the subsampled representation is not sufficient, determining, by the processor, based on the subsampled representation, a region of the image of interest for the execution of the machine vision task;
    reusing, by the processor, the image captured by the image sensor array to obtain a further representation of the determined region of the image by directing the image sensor array to sample the image captured by the image sensor array at a second resolution in the determined region of the image, the second resolution being higher than the first resolution; and analyzing, by the processor, the further representation of the determined region to assess whether the further representation is sufficient to support the execution of the machine vision task by implementing a procedure for the execution of the machine vision task in accordance with the further representation.

7. The machine vision method of claim 6, wherein determining the region of the image, reusing the image, and analyzing the further representation are repeated until the further representation is sufficient to support the execution of the machine vision task.

8. The machine vision method of claim 7, further comprising directing the image sensor array to increase the second resolution between repeated instances of reusing the image.

9. The machine vision method of claim 6, wherein analyzing the subsampled representation to assess whether the subsampled representation is sufficient comprises implementing, by the processor, the procedure configured to execute the machine vision task, the subsampled representation being an input to the procedure.

10. The machine vision method of claim 6, wherein the procedure is configured to generate a confidence level in connection with the execution of the machine vision task.

11. The machine vision method of claim 10, wherein the subsampled representation is sufficient if the confidence level reaches a threshold confidence level.

12. The machine vision method of claim 6, wherein determining the region of interest comprises:
assigning a value to each data element in the subsampled representation, the value being indicative of relevance to the machine vision task;
estimating a rate of change for each data element in the subsampled representation;
calculating, for each data element, an importance scalar as a function of the assigned value and the estimated rate of change; and
generating a map of the subsampled representation based on whether the calculated importance reaches a threshold.

13. The machine vision method of claim 6, wherein the procedure and the machine vision task are configured to characterize an object within the region of interest.

14. The machine vision method of claim 6, wherein reusing the image comprises sending, by the processor, to a decoder of the image sensor array, a command specifying the determined region.

15. The machine vision method of claim 6, wherein reusing the image comprises directing, by the processor, a parallel readout of the image sensor array, to provide the further representation of the determined region.

16. The machine vision method of claim 6, further comprising establishing, by the processor, a subsampling level for the subsampled representation based on a size of an object in the region of interest.

17. The machine vision method of claim 16, further comprising:
obtaining, by the processor, an initial subsampled representation of the image at a resolution lower than the first resolution; and
determining, by the processor, the size of the object of interest based on the initial subsampled representation.

18. The machine vision method of claim 6, further comprising:
estimating, by the processor, a velocity of an object in the region of interest and a future location of the object of interest based on the estimated velocity; and
applying, by the processor, the estimated future location in connection with obtaining a representation of a subsequent image frame captured by the image sensor array.

19. The machine vision method of claim 6, wherein:
the processor is configured to implement an auto-encoder and a classifier cascaded with the auto-encoder; and
determining the region of interest comprises processing the subsampled representation with the auto-encoder and the classifier to determine an importance map for the subsampled representation for the machine vision task, the importance map comprising a respective importance level for each pixel of the subsampled representation.

20. The machine vision method of claim 19, wherein determining the region further comprises:
discarding each pixel of the subsampled representation for which the importance level is below a threshold; and
determining bits of each non-discarded pixel of the subsampled representation that provide accuracy and encoding length.

21. The machine vision method of claim 6, further comprising:
capturing, with logarithmic pixels of the image sensor array, the image, each logarithmic pixel providing an output exhibiting gamma compression; and
subsampling, with an averaging circuit coupled to the image sensor array, the outputs of the logarithmic pixels, the averaging circuit being configured to implement pixel binning.

22. The machine vision method of claim 21, further comprising processing the subsampled outputs in accordance with a deep neural network.

23. The machine vision method of claim 21, wherein processing the subsampled outputs in accordance with a deep neural network is implemented by the processor.

24. The machine vision method of claim 23, wherein the processor is an image sensor processor.

25. A machine vision system comprising:
an image sensor comprising:
an array of logarithmic pixels, each logarithmic pixel of the array being configured to provide an output exhibiting gamma compression; and
an averaging circuit coupled to the image sensor, the averaging circuit being configured to subsample the outputs of the array of logarithmic pixels;
an image sensor processor coupled to the averaging circuit, the image sensor processor being configured to process the subsampled outputs in accordance with a deep neural network; and
a host processor configured to implement a machine vision task based on data provided via the image sensor processor.

26. The machine vision system of claim 25, wherein the image sensor processor is integrated with the image sensor.

27. The machine vision system of claim 25, wherein:
the image sensor further comprises a digital readout stage to support communications with the host processor; and
the averaging circuit is an analog circuit disposed upstream of the digital readout stage.

28. The machine vision system of claim 27, wherein:
the averaging circuit comprises a plurality of analog readout capacitors coupled to the array of logarithmic pixels; and
the digital readout stage comprises a plurality of analog-to-digital converters coupled to the plurality of analog readout capacitors.

\* \* \* \* \*